(No Model.)
N. CLOUETTE.
COMBINED TRAP AND DIRT COLLECTOR.
No. 395,313. Patented Jan. 1, 1889.
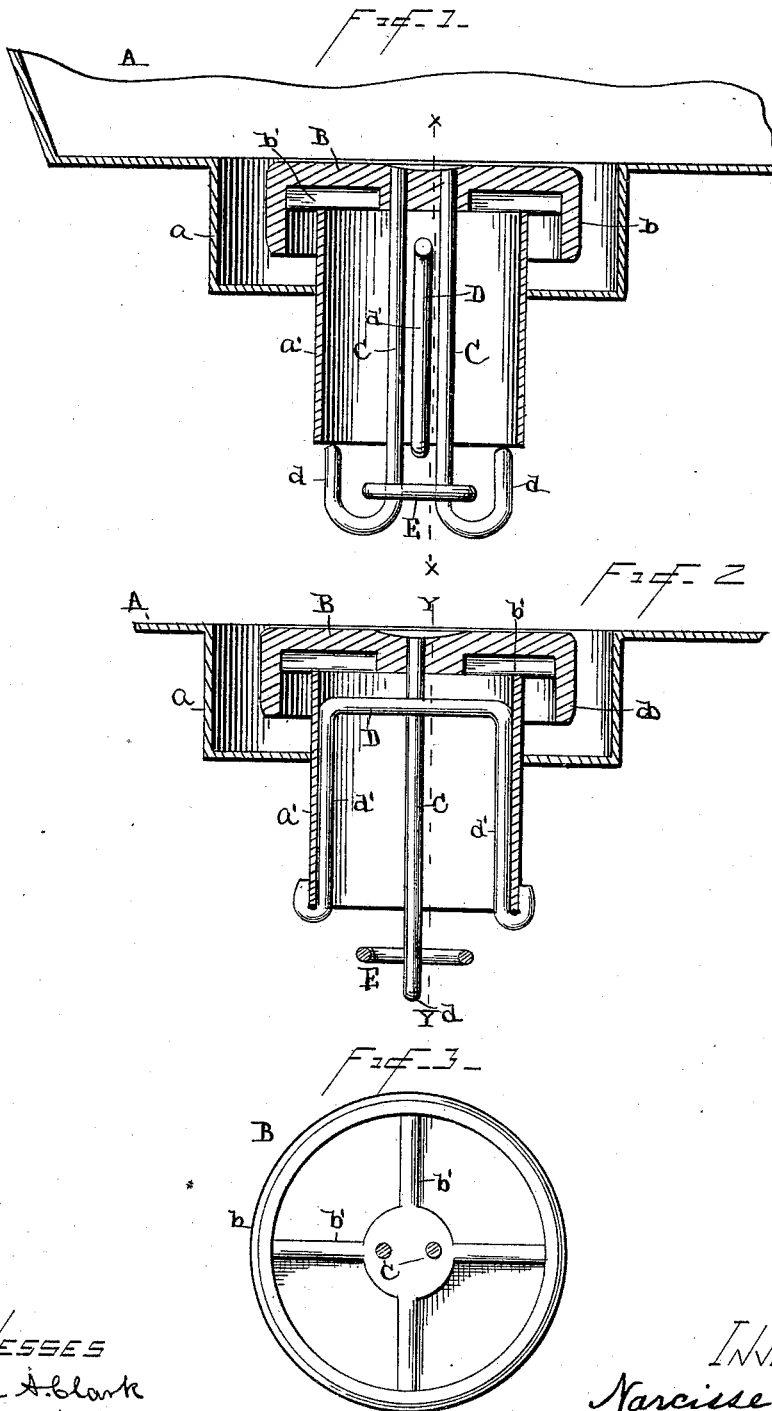

UNITED STATES PATENT OFFICE.

NARCISSE CLOUETTE, OF MANCHESTER, NEW HAMPSHIRE, ASSIGNOR OF ONE-HALF TO EBEN C. WILLEY, OF SAME PLACE.

COMBINED TRAP AND DIRT-COLLECTOR.

SPECIFICATION forming part of Letters Patent No. 395,313, dated January 1, 1889.

Application filed April 30, 1888. Serial No. 272,320. (No model.)

*To all whom it may concern:*

Be it known that I, NARCISSE CLOUETTE, a citizen of the United States, residing at Manchester, in the county of Hillsborough and State of New Hampshire, have invented certain new and useful Improvements in a Combined Trap and Dirt-Collector; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined trap and dirt-collector for basins and sinks, and has for its object to provide a device that will prevent the escape of sewer-gas into the room, and which will catch all foreign matter that would have a tendency to choke the waste-pipe, if permitted to enter the same.

The improvement consists of the peculiar construction and combination of parts, which hereinafter will be more fully described and claimed, and shown in the annexed drawings, in which—

Figure 1 is a sectional view of the lower portion of one end of a sink on the line Y Y of Fig. 2, showing my invention. Fig. 2 is a detail sectional view on the line X X of Fig. 1; and Fig. 3 is a bottom plan view of the cap.

My improvement will be described in connection with a sink, A, having the usual depression, $a$, and short tube $a'$, the upper end of which extends some distance above the bottom of the depression.

The cap B is larger than the tube $a'$, so as to leave a space between its flange $b$ and the side of the tube for the escape of the water, and is provided with radial ribs $b'$ on its inner side, which rest on the end of the tube $a'$ and form water-ways between the ribs for the escape of the water between the cap and the end of the tube $a'$. The spring-arms C, fastened at their upper ends in openings near the center of the cap, have their lower ends bent outward to form the hooks $d$.

The anchoring-bail D is $\sqcap$-shaped, and the ends of its vertical branches are bent out to engage with the lower end of the tube $a'$. This bail is formed of spring-wire and fits snugly within the tube $a'$, being placed therein from either end. When inserted in the tube from above, the vertical branches $d'$ are compressed sufficiently to allow the bent ends thereof to enter the tube. On pushing the bail down the branches $d'$ will spring out, when their bent ends clear the lower end of the tube.

The spring-arms C embrace the upper end of the bail and are held thereto by the ring E, which encircles the arms C below the end of the bail. The cap has a limited vertical movement, being prevented from disengagement by the ring E, engaging with the bail, and with the hooks $d$ of the arms C.

Having thus described my invention, what I claim, and desire to secure by Letters Patent, is—

1. The herein shown and described trap, composed of the sink having a depression, the short tube projecting up from the bottom of the depression, the cap having ribs on its inner side and provided with arms having hooked ends, the anchoring-bail fitted between the arms, and the ring encircling the said arms, substantially as and for the purpose specified.

2. The combination, with the sink having the depression, and the tube $a'$, extending up from the bottom of the depression, of the cap having radial ribs on its inner side, the spring-arms C, having their lower ends bent to form hooks, the spring-bail D, fitted in the short tube, and the ring encircling the lower ends of the arms C below the top of the bail, substantially as and for the purpose described.

In testimony whereof I affix my signature in presence of two witnesses.

NARCISSE CLOUETTE.

Witnesses:
HERBERT N. WILSON,
N. H. WILSON.